United States Patent
Zotter et al.

(10) Patent No.: US 7,913,244 B2
(45) Date of Patent: Mar. 22, 2011

(54) SIDE BY SIDE FOR WEB SERVICES

(75) Inventors: Brian Zotter, San Ramon, CA (US); Peter Dapkus, Oakland, CA (US); Lei Jin, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1074 days.

(21) Appl. No.: 11/625,227

(22) Filed: Jan. 19, 2007

(65) Prior Publication Data

US 2007/0288915 A1 Dec. 13, 2007

Related U.S. Application Data

(60) Provisional application No. 60/804,533, filed on Jun. 12, 2006.

(51) Int. Cl.
*G06F 9/44* (2006.01)
*G06F 15/16* (2006.01)
(52) U.S. Cl. ........ 717/168; 717/174; 717/178; 717/169; 717/170; 717/175; 709/217; 709/219
(58) Field of Classification Search .................. 717/168, 717/174; 709/217, 219
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 7,263,551 B2 * | 8/2007 | Belfiore et al. | 709/219 |
| 7,380,003 B1 * | 5/2008 | Guo et al. | 709/226 |
| 2002/0157090 A1 * | 10/2002 | Anton, Jr. | 717/178 |
| 2004/0224674 A1 * | 11/2004 | O'Farrell et al. | 455/418 |
| 2005/0144591 A1 * | 6/2005 | Banks | 717/122 |
| 2008/0082660 A1 * | 4/2008 | Bachmann et al. | 709/224 |

OTHER PUBLICATIONS

Kaminski et al. "A Design Technique for Evolving Web Services" Copyright 2006 Piotr Kaminski, Hausi Muller, and IBM Canada Ltd.*
Denaro et al. "Towards Self-Adaptive Service-Oriented Architectures" TAV-WEB'06, Jul. 17, 2006, Portland Maine, USA.*
Kaminski et al. "A Design for Adaptive Web Service Evolution" SEAMS'06, May 21-22, 2006, Shanghai, China.*

* cited by examiner

*Primary Examiner* — Thomas K Pham
(74) *Attorney, Agent, or Firm* — Fliesler Meyer LLP

(57) ABSTRACT

SOAP requests can contain version related information. The version related information of the SOAP request can be checked and based on the version related information, the SOAP request can be sent to an old or new version of the web service.

21 Claims, 3 Drawing Sheets

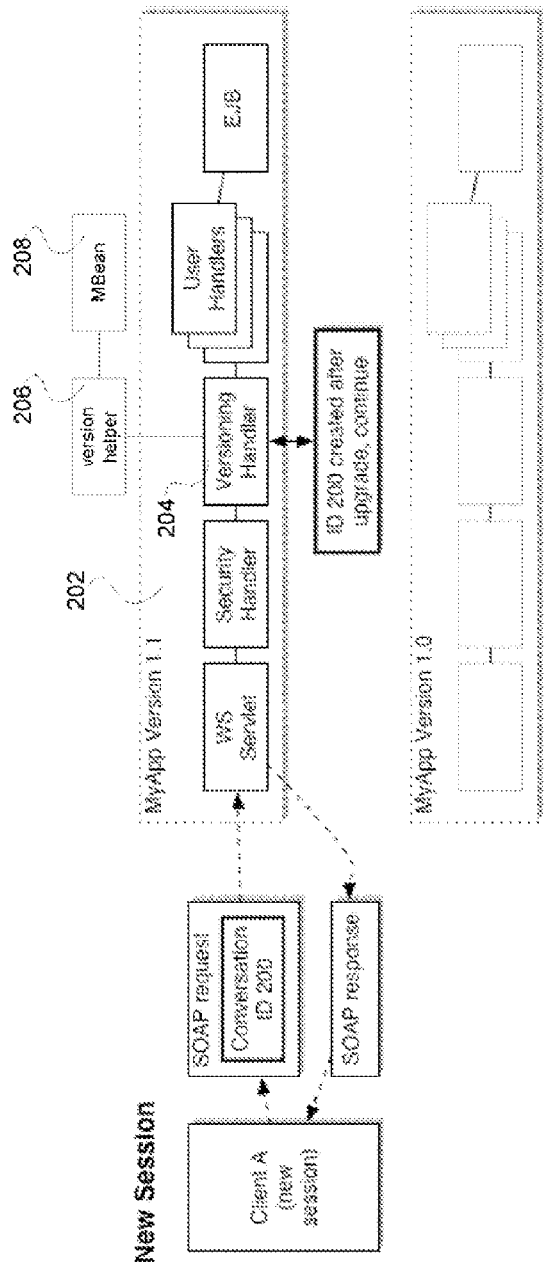
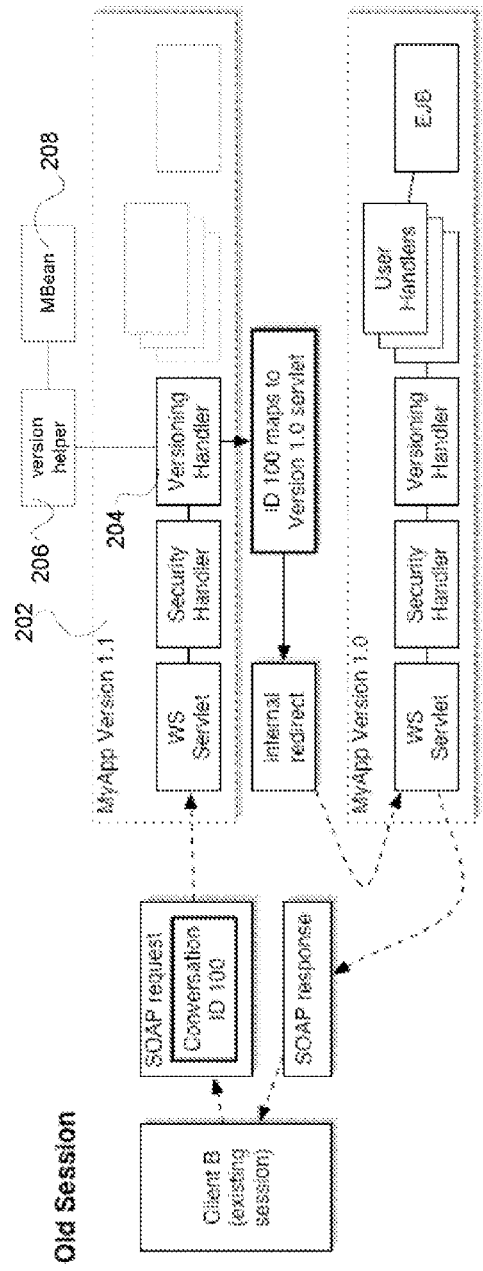

SIDE BY SIDE FOR WEB SERVICES

CLAIM OF PRIORITY

This application claims priority of U.S. Provisional Application No. 60/804,533 entitled "Side by Side for Web Services" filed Jun. 12, 2006, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Updating software in a production environment can cause downtime. This can be a serious disadvantage for customers. One way to minimize the effect of the downtime is to update the software at night. This can be difficult for administrators and may not completely avoid the problem if customers are global.

BRIEF DESCRIPTION OF THE DRAWINGS

FIGS. 2A and 2B show an exemplary side by side web service deployment of one embodiment.

DETAILED DESCRIPTION

Figure 1:
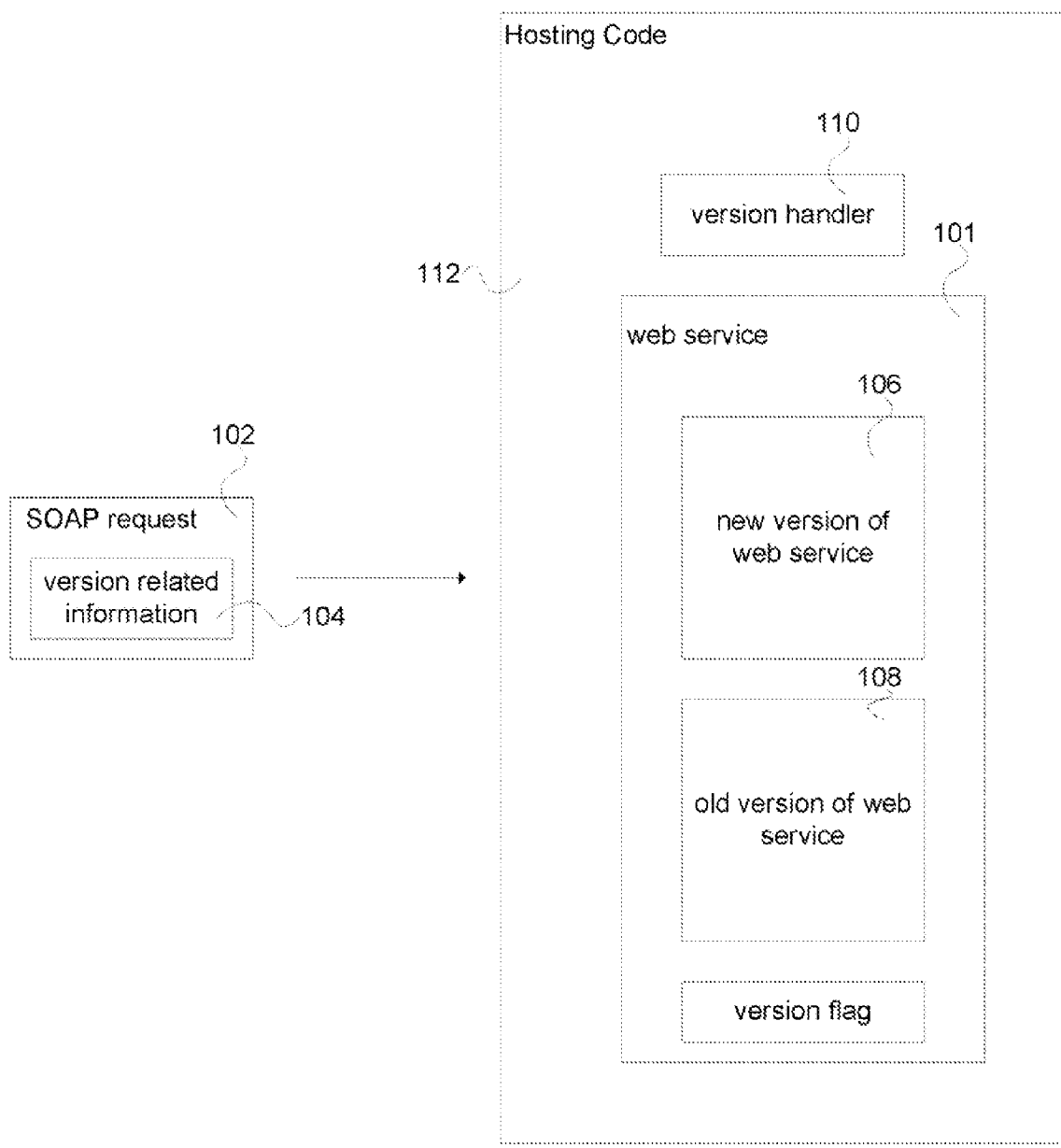
FIG. 1 shows a side by side deployment of web service of one embodiment.

Side by Side deployment of web services can allow two versions of a web services to operate concurrently. The old version can deal with old conversations and callbacks and the new version can deal with new conversions and callbacks. This can allow an administrator to start up a new version of a web service at any time without disrupting customers.

Embodiments of the present invention can include receiving a SOAP request 102. The SOAP request 102 can contain version related information 104. Based on the version related information 104, the soap request 102 can be sent to an old version 108 of the web services or to a new version 106 of the web service.

The version related information 104 can be a conversation ID. A version handler 110 can check the conversation ID. Callbacks from the old version 108 can include information indicating that it is from the old version 108. The old version can be un-deployed when it is not needed by the client.

Web services can have a version aware flag that indicates whether a new version of the web service can operate concurrently with an old version. The system can check this flag then automatically produce a side-by-side web service if the flag is enabled when the new version launches.

In one embodiment, there is no downtime required for the web service to start the new version. The system does not need to halt accepting new clients to allow the old version to finish all of the old conversations.

One embodiment of the present invention is a computer system comprising at least one web service and code hosting the at least one web service. A new version 106 of the web service can be run concurrently with an old version 108. The hosting code can automatically send SOAP messages to the old or new version as indicated by version related information 104. The hosting code 112 can be an application server, such as a WebLogic™ server.

FIG. 2 shows details of one embodiment. In this example, SOAP requests for all versions of a web service can sent to the same URL. In one embodiment, versioning is not exposed as a different URL. The new version 202 can have a version handler 204 that can work with a version helper 206 and MBean 208 to route the SOAP requests to the correct version. In one embodiment, the version helper 206 keeps track of the conversation initiation counts for a version. The count can be stored in MBean 208 and decreased when a conversation ends. When all of the conversations are finished as indicated by the count, the old version of the web service version can be un-deployed.

In one embodiment, code hosting can be used to check a conversation ID. For example, a version handler or other code can be inserted into the server handler chain. The version handler can run after the connection and code handlers. The version handler can look up the target version of a conversational request. The conversational application version can be part of a continue header. A ConverstionServerHandler can put the application version in the continue header or other headers. If the current version of the application is not the intended version, requests can be redirected to the target version. A delegated local server transport can be used to forward the request. Transport headers of the original request can be available to the redirected application. Encoding of responses and faults can be done with proper class loader hierarchy.

In one embodiment, an async invoke state can have the versioning information of the requestor. The response to the asynchronous request can be received by the AsyncResponseBean as a request. The asynchronous response can be forwarded to the right version using the LocalConnection transport.

Figure 3:
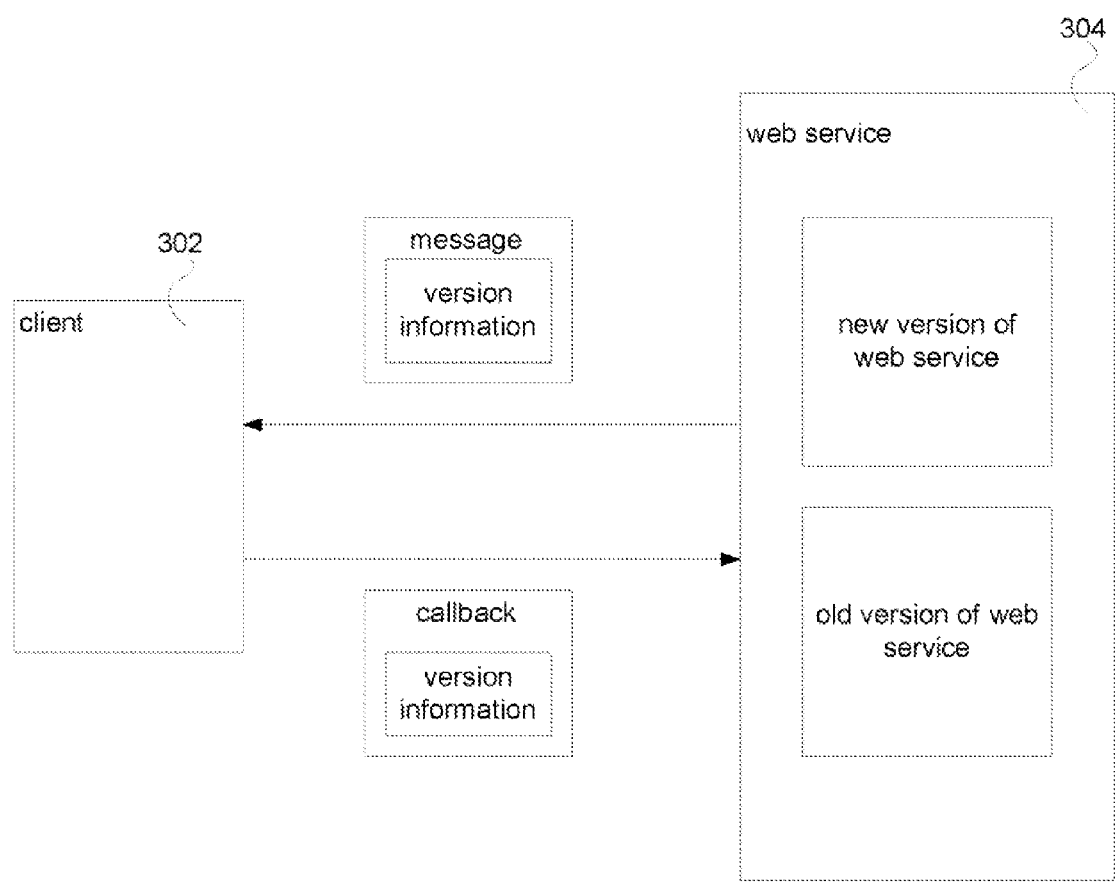
FIG. 3 shows an exemplary side by side web service deployment web service of one embodiment to callbacks.

FIG. 3 shows a callback. In a callback, a client 302 sends a callback to a web service 304 after a period of time. The callback can include version information that can allow the web service 304 to determine what version should receive the callback.

In one embodiment, when a service with callback endpoint is initialized, the version can be recorded in the callback information header. When the callback is sent, the callback conversation handler can extract the versioning information and place it in the message context. In the callback method, target port can be looked up using the incoming class name and version and the callback delivered.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional components circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, mirco drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating system, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments where chosen and described in order to best explain the principles of the invention and its practical application, thereby enabling other skilled in the art to understand the invention for various embodiments and with various modifications that are suited to the particular used contemplated. It is intended that the scope of the invention be defined by the claims and their equivalents.

What is claimed is:

1. A computer-implemented method comprising:
   providing, at a server,
      a web service which is accessible by a URL and which is associated with a version-aware flag that indicates whether multiple versions of the web service can be run side by side on the server and accessed by the same URL, including
         a first version of the web service,
         a second version of the web service, and
         a version handler configured to route incoming web service requests to one of the first or second versions of the web service, based on conversation ids within the requests;
   receiving at the URL a SOAP request which is directed to the web service, and wherein the SOAP request includes a particular conversation id;
   using the particular conversation id of the SOAP request to determine whether that SOAP request should be routed to the first version of the web service or the second version of the web service;
   based on the particular conversation id, sending the SOAP request to the determined version of the web service; and
   for each version of the web service, maintaining a count of conversations initiated at that web service, and decrementing the count as each conversation is ended, to determine when all current conversations at that version have finished.

2. The computer-implemented method of claim 1, wherein the version related information is a conversation ID.

3. The computer-implemented method of claim 1, wherein callbacks from the old version include an indication that it is from the old version.

4. The computer-implemented method of claim 1, wherein the old version is un-deployed when it is not needed by clients.

5. The computer-implemented method of claim 1, wherein the version aware flag indicates whether new versions of the web service will operate concurrently with an old version.

6. The computer-implemented method of claim 1, wherein there is no downtime of the web service to start the new version.

7. A non-transitory computer-readable medium containing code to:
   provide, at a server,
      a web service which is accessible by a URL and which is associated with a version-aware flag that indicates whether multiple versions of the web service can be run side by side on the server and accessed by the same URL, including
         a first version of the web service,
         a second version of the web service, and
         a version handler configured to route incoming web service requests to one of the first or second versions of the web service, based on conversation ids within the requests;
   receive at the URL a SOAP request which is directed to the web service, and wherein the SOAP request includes a particular conversation id;
   use the particular conversation id of the SOAP request to determine whether that SOAP request should be routed to the first version of the web service or the second version of the web service;
   based on the particular conversation id, send the SOAP request to the determined version of the web service; and
   for each version of the web service, maintain a count of conversations initiated at that web service, and decrementing the count as each conversation is ended, to determine when all current conversations at that version have finished.

8. The computer-readable medium of claim 7, wherein the version related information is a conversation ID.

9. The computer-readable medium of claim 7, wherein callbacks from the old version include an indication that it is from the old version.

10. The computer-readable medium of claim 7, wherein the old version is un-deployed when it is not needed by clients.

11. The computer-readable medium of claim 7, wherein the version aware flag indicates whether new versions of the web service will operate concurrently with an old version.

12. The computer-readable medium of claim 7, wherein there is no downtime of the web service to start the new version.

13. A computer system comprising:
at least one web service which is accessible by a URL and which is associated with a version-aware flag that indicates whether multiple versions of the web service can be run side by side on the server and accessed by the same URL, including
a first version of the web service,
a second version of the web service;
a version handler configured to route incoming web service requests to one of the first or second versions of the web service, based on conversation ids within the requests; and
code which when executed by the system cause the system to
receive at the URL a SOAP request which is directed to the web service, and wherein the SOAP request includes a particular conversation id,
use the particular conversation id of the SOAP request to determine whether that SOAP request should be routed to the first version of the web service or the second version of the web service,
based on the particular conversation id, send the SOAP request to the determined version of the web service, and
for each version of the web service, maintaining a count of conversations initiated at that web service, and decrementing the count as each conversation is ended, to determine when all current conversations at that version have finished.

14. The computer system of claim 13, wherein the hosting code is an application server.

15. The computer system of claim 13, wherein the version related information is a conversation ID.

16. The computer system of claim 13, wherein callbacks from the old version include an indication that it is from the old version.

17. The computer system of claim 13, wherein the old version is un-deployed when it is not needed by clients.

18. The computer system of claim 13, wherein the version aware flag indicates whether new versions of the web service will operate concurrently with an old version.

19. The computer system of claim 13, wherein there is no downtime of the web service to start the new version.

20. A computer-implemented method comprising:
providing, at a server,
a web service which is accessible by a URL and which is associated with a version-aware flag that indicates whether multiple versions of the web service can be run side by side on the server and accessed by the same URL, including
a first version of the web service,
a second version of the web service, and
a version handler configured to route incoming web service requests to one of the first or second versions of the web service, based on conversation ids within the requests;
receiving at the URL a SOAP request which is directed to the web service, and wherein the SOAP request includes a particular conversation id;
checking the conversation ID of the SOAP request to determine whether that SOAP request should be routed to the first version of the web service or the second version of the web service, and
if the conversation ID was created before a new version of a web service has started, sending the SOAP request to an old version of the web service; and
if the connection ID was created after the new version of the web service was started, sending the SOAP request to the new version of the web service; and
for each version of the web service, maintaining a count of conversations initiated at that web service, and decrementing the count as each conversation is ended, to determine when all current conversations at that version have finished.

21. A computer-implemented method comprising:
providing, at a server,
a web service which is accessible by a URL and which is associated with a version-aware flag that indicates whether multiple versions of the web service can be run side by side on the server and accessed by the same URL, including
a first version of the web service,
a second version of the web service, and
a version handler configured to route incoming web service requests to one of the first or second versions of the web service, based on conversation ids within the requests;
while an old version of a web service is deployed, receiving a request to start a new version of a web service;
checking the version-aware flag to see if the web service allows concurrent versions and if so, deploying the new version of a web service concurrently with the old version; and
for each version of the web service, maintaining a count of conversations initiated at that web service, and decrementing the count as each conversation is ended, to determine when all current conversations at that version have finished.

* * * * *